Patented Feb. 24, 1931

1,793,726

UNITED STATES PATENT OFFICE

MARKUS THAU, OF BROOKLYN, NEW YORK

NONINFLAMMABLE NITROCELLULOSE LACQUER

No Drawing.  Application filed April 21, 1925. Serial No. 24,873.

My invention relates to the production of cellulose lacquers. More specifically, it relates to the production of non-inflammable, non-poisonous, neutral lacquers having as the cellulose component, nitrocellulose, acetyl cellulose or like cellulose ester.

Non-inflammable lacquers are, so far as I am aware, generally produced by bringing cellulose acetate in solution in tetrachlorethane. This method has been patented by Lederer. Non-inflammable nitrocellulose lacquers have been manufactured by bringing the nitrocellulose in solution in epichlorhydrin or dichlorhydrin. However, lacquers of this character have the great disadvantage that the solvents do not completely evaporate. Furthermore, epichlorhydrin and dichlorhydrin have a tendency to develop muriatic acid which is greatly detrimental to the lacquer. The invention set forth in Swiss Patent No. 66,509 is an improvement in that nitrocellulose lacquers are produced by adding to a concentrated solution of nitrocellulose in organic solvents such as amyl acetate, liquid chlorine derivatives of hydrocarbons with two carbon atoms. As such chlorine derivatives, the patent mentions: dichlorethylene, trichlorethylene, tetrachlorethylene, tetrachlorethane, and pentachlorethane. Most of these solvents, in addition to being disadvantageous due to their tendency to liberate muriatic acid, can hardly be used since they are poisonous and have an anæsthetic effect.

The use of carbon tetrachlorid to produce non-inflammable cellulose lacquers, especially nitrocellulose lacquers is more desirable as its vapors are not more detrimental to the health than the generally used lacquer solvents and it does not liberate muriatic acid. However, the manufacture of non-inflammable nitrocellulose lacquers with the use of carbon tetrachlorid has heretofore been impossible because it was necessary to add so much carbon tetrachloride to the lacquer to attain the high flash point desired that the solvents would not keep the nitrocellulose in solution. If enough carbon tetrachlorid is added to the lacquer to make it non-inflammable, the nitrocellulose is precipitated.

To illustrate the difficulties encountered in this respect, we cite the experiments made by Griesheim Elektron and described in Chemical Review, 1906, page 56, regarding the inflammability of mixtures of carbon tetrachlorid with inflammable liquids. These experiments show that a mixture of 20 parts of gasoline and 80 parts of carbon tetrachlorid flashes while a mixture of 30 parts gasoline and 70 parts carbon tetrachlorid burns. This illustrates the difficulty the prior art workers experienced in the manufacture of non-inflammable nitrocellulose lacquers. They found it totally impossible to keep nitrocellulose in solution if the proportion of solvents and carbon tetrachlorid approximated the ratio, 1 : 4. The invention in the previously cited Swiss Patent No. 66,509 to the Actien-Gesellschaft Fur Anilin-Fabrikation, Berlin-Treptow (Deutschland), is restricted to the use of chlorine derivatives of hydrocarbons with two carbon atoms, obviously for the reason that the inventor was unable to produce satisfactory results with carbon tetrachlorid.

I have discovered that when a cellulose ester, for example actyl cellulose or nitrocellulose is dissolved in the proper solvent, the resulting cellulose solution can be made noninflammable by the use of carbon tetrachlorid. My experiments indicate that the proper solvents are those characterized by the qualities of a high flash point and a very high capacity to dissolve the cellulose ester, for example nitrocellulose. Using solvents of this character, only a relatively small amount of carbon tetrachlorid has to be added to the cellulose solution to bring the flash point up to the required limit. The small quantity of carbon tetrachlorid so used will not precipitate the nitrocellulose from the solvent medium. The use of carbon tetrachlorid results in the production of a non-inflammable, non-poisonous, neutral cellulose lacquer.

It is also necessary that the solvents used together with the carbon tetrachlorid, have a vapor tension that is not much greater than that of the carbon tetrachlorid, as that would in itself make it difficult to produce a non-inflammable mixture. Furthermore, the specific gravity of the vapor of the solvents should not be greater than that of the vapor of the carbon tetrachlorid for the same reason.

As the carbon tetrachlorid has a great tendency to evaporate, it is necessary to add a surplus of it to have an even curve of evaporation for the solvents; otherwise the carbon tetrachlorid will all evaporate first, creating difficulties in the application of the lacquers. This again requires a certain excess of carbon tetrachlorid.

A non-inflammable lacquer, as I understand it, should have a flash point above the legal limit of 80° F. and should furthermore not ignite at room temperature if brought in direct contact with an open flame.

Generally speaking, I have discovered that a cellulose lacquer may be made non-inflammable, non-poisonous and neutral by the addition of a non-inflammable agent when the following conditions are satisfied: (1) The cellulose ester solvent is characterized by a high flash point with a great capacity to dissolve nitrocellulose (2) the cellulose ester solvent together with the non-inflammable agent must have a vapor tension not much greater than that of the non-inflammable agent itself (3) the specific gravity of the vapor of the solvent or solvents should not be greater than that of the vapor of the non-inflammable agent.

As examples of solvents which I have found to satisfy all the conditions butyl acetate and ethyl lactate may be given. It is possible to substitute some of the butyl acetate and ethyl lactate with ethyl acetate to a limited extent. To illustrate my invention the following examples are given:

9.3 grams of nitrocellulose are dissolved in 36 c. c. ethyl acetate and 53 c. c. of butyl acetate. After solution is complete, add 83 c. c. of carbon tetrachlorid while stirring well. To this solution a solution of 2 grams dammar gum in 25 c. c. carbontetrachlorid and 15 c. c. butylalcohol and a solution of 1 c. c. castor oil, 0.5 grams camphor in 8 c. c. butyl alcohol is added. As another example, 9.3 grams nitrocellulose are dissolved in 89 c. c. butylacetate. After solution is complete, add 90 c. c. carbontetrachlorid. To this solution, 23 c. c. butylalcohol and 0.5 grams camphor is added. The lacquers produced according to the examples given are non-inflammable and of excellent qualities in every respect. It does not turn acid and does not precipitate the nitrocellulose even after standing a long time. It is not poisonous.

It is obvious that the proportions of the reacting materials above set forth may be changed and still be within the spirit of my invention.

From the foregoing, it will be noted that a nitrocellulose lacquer has been produced and that the lacquer consists essentially of nitrocellulose, butyl acetate and carbontetrachlorid. Furthermore, this lacquer is non-inflammable and non-combustible. It has its flash point at 80° F., and for particular lacquers or for particular enamel lacquers certain other solvents as ethyl acetate or ethyl lactate and non-solvents as butyl alcohol or xylol and also coloring matter as lithopone, zinc white or carbon black are utilized, and in certain cases as stated, castor oil, gums or camphor or either of them.

When my improved lacquer is placed in metal containers for instance, tin cans, I find it advantageous to add some turpentine to the lacquer, preferably 5 to 10%, to prevent acid being formed after long standing. I have found that this is not as necessary when lacquer is kept in glass containers for a reasonable length of time, corresponding to a normal usage.

The invention comprises in addition to the novel products of manufacture also novel methods of manufacture hereinabove set forth, and as finally pointed out in the claims.

I claim:

1. An non-inflammable cellulose ester lacquer characterized by its ability to keep the cellulose ester in solution comprising the mixture resulting from dissolving a cellulose ester in a solvent and adding to such solution carbon tetrachloride, the solvent and non-inflammable agent being characterized by the the following qualities: (1) the cellulose ester solvent possesses a high flash point with a great capacity to dissolve the cellulose ester; (2) the cellulose ester solvent together with the carbon tetrachloride have a vapor tension not materially greater than that of the carbon tetrachloride itself; and (3) the specific gravity of the vapor of the solvent or solvents should not be greater than that of the vapor of the carbon tetrachloride.

2. A non-inflammable cellulose ester lacquer characterized by its ability to keep the cellulose ester in solution comprising the mixture resulting from dissolving a cellulose ester in a solvent with a high flash point and adding to the resulting solution carbon tetra chlorid in sufficient quantity to make the mixture non-inflammable.

3. A non-inflammable cellulose ester lacquer characterized by its ability to keep the cellulose ester in solution comprising the mixture resulting from dissolving a cellulose ester in butyl acetate and adding to the resulting solution carbon tetra chlorid in sufficient quantity to make the mixture non-inflammable.

4. A non-inflammable nitrocellulose lacquer characterized by its ability to keep the nitrocellulose in solution comprising the mixture resulting from dissolving nitrocellulose in a solvent with a high flash point and adding to the resulting solution carbon tetra chlorid in sufficient quantity to make the mixture non-inflammable.

5. A non-inflammable nitrocellulose lacquer characterized by its ability to keep the nitrocellulose in solution comprising the mixture resulting from dissolving nitrocellulose in butyl acetate and adding to the resulting solution carbon tetra chlorid in sufficient quantity to make the mixture non-inflammable.

6. A lacquer containing nitrocellulose, butyl acetate and carbon tetrachlorid.

7. A lacquer containing nitrocellulose in solution with butyl acetate, with enough carbon tetrachlorid present to make the solution non-inflammable and non-combustible.

8. A lacquer containing nitrocellulose in solution with butyl acetate, and carbon tetrachlorid, said lacquer being non-inflammable and non-combustible, and said carbon tetrachlorid rendering said lacquer of a flash point above 80° F.

9. A lacquer containing nitrocellulose, butyl acetate, carbon tetrachlorid and turpentine.

10. A lacquer containing nitrocellulose in solution with butyl acetate and turpentine, with enough carbon tetrachlorid present to make the solution non-inflammable and non-combustible.

In testimony that he claims the foregoing as his invention, he has signed his name hereto.

MARKUS THAU.